US012567305B2

(12) United States Patent
Thompson et al.

(10) Patent No.: US 12,567,305 B2
(45) Date of Patent: Mar. 3, 2026

(54) SYSTEMS AND METHODS FOR AUTOMATIC LIGHTING CONFIGURATION OF A CABINET

(71) Applicant: Aristocrat Technologies Australia Pty Limited, North Ryde (AU)

(72) Inventors: David Thompson, Narrabeen (AU); Jeffrey Skeen, Cherrybrook (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 286 days.

(21) Appl. No.: 18/322,686

(22) Filed: May 24, 2023

(65) Prior Publication Data

US 2024/0395102 A1 Nov. 28, 2024

(51) Int. Cl.
*A63F 13/02* (2006.01)
*G07F 17/32* (2006.01)
*H05B 45/30* (2020.01)

(52) U.S. Cl.
CPC ......... *G07F 17/3216* (2013.01); *H05B 45/30* (2020.01)

(58) Field of Classification Search
None
See application file for complete search history.

(56) References Cited

U.S. PATENT DOCUMENTS 6,923,720 B2 8/2005 Loose
8,376,839 B2 * 2/2013 Lesley .................... G07F 17/34 427/166
8,684,810 B2 4/2014 Seelig
8,939,835 B2 * 1/2015 Tan ......................... A63F 13/28 463/31
9,005,021 B2 4/2015 Massing
9,087,429 B2 7/2015 Brunell
9,520,018 B2 12/2016 Brunell
10,019,868 B2 * 7/2018 Castro .................. G02B 6/0006
10,762,831 B2 * 9/2020 Winston .................. A63F 13/90
2008/0039213 A1 * 2/2008 Cornell ................... G07F 17/32 463/46
2011/0118034 A1 * 5/2011 Jaffe ................... G07F 17/3211 463/47
2012/0040738 A1 * 2/2012 Lanning .............. G07F 17/3211 463/31

* cited by examiner

*Primary Examiner* — Sunit Pandya
(74) *Attorney, Agent, or Firm* — Armstrong Teasdale LLP

(57) ABSTRACT

An electronic gaming device is provided. The electronic gaming device may include a cabinet, a memory, a first lighting strip removably coupled to the cabinet, the first lighting strip comprising a first number of light emitting diode (LED) drivers and a first number of LEDs, a second lighting strip removably coupled to the cabinet, the second lighting strip comprising a second number of LED drivers and a second number of LEDs, and a lighting controller. The lighting controller may be configured to detect a number of LED drivers currently coupled to the cabinet, determine if: (i) the first lighting strip is currently coupled to the cabinet and (ii) the second lighting strip is currently coupled to the cabinet, select a display sequence from the memory based at least in part on the determination, and instruct LED drivers currently coupled to the cabinet to display the selected display sequence.

20 Claims, 10 Drawing Sheets

SYSTEMS AND METHODS FOR AUTOMATIC LIGHTING CONFIGURATION OF A CABINET

TECHNICAL FIELD

The field of disclosure relates generally to electronic gaming devices, and more particularly, to systems and methods for automatic detection of a cabinet lighting configuration and cabinet position of an electronic gaming device.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is provided. The electronic gaming device may include a cabinet, a memory, a first lighting strip removably coupled to the cabinet, wherein the first lighting strip includes a first number of light emitting diode (LED) drivers and a first number of LEDs, a second lighting strip removably coupled to the cabinet, wherein the second lighting strip includes a second number of LED drivers and a second number of LEDs, and a lighting controller. The lighting controller may be configured to detect a number of LED drivers currently coupled to the cabinet. The lighting controller may be further configured to based on the detected number of LED drivers, determine if: (i) the first lighting strip is currently coupled to the cabinet and (ii) the second lighting strip is currently coupled to the cabinet. The lighting controller may be further configured to select a display sequence from the memory based at least in part on the determination. The lighting controller may be further configured to instruct LED drivers currently coupled to the cabinet to display the selected display sequence. The second number of LED drivers may be different from the first number of LED drivers.

In another aspect, a method for controlling lighting for an electronic gaming device is provided. The electronic gaming device may include a cabinet a memory a first lighting strip removably coupled to the cabinet, the first lighting strip including a first number of LED drivers and a first number of LEDs, and a second lighting strip removably coupled to the cabinet, the second lighting strip including a second number of LED drivers and a second number of LEDs, the second number of LED drivers different from the first number of LED drivers. The method may include detecting a number of LED drivers currently coupled to the cabinet. The method may further include, based on the detected total number of LED drivers, determining if: (i) the first lighting strip is currently coupled to the cabinet and (ii) the second lighting strip is currently coupled to the cabinet. The method may further include selecting a display sequence from the memory based at least in part on the determination. The method may further include instructing LED drivers currently coupled to the cabinet to display the selected display sequence.

In another aspect, at least one non-transitory computer-readable storage media having computer-executable instructions embodied thereon is provided. When executed by a lighting controller of an electronic gaming device including a cabinet a memory a first lighting strip removably coupled to the cabinet, the first lighting strip including a first number of LED drivers and a first number of LEDs, and a second lighting strip removably coupled to the cabinet, the second lighting strip including a second number of LED drivers and a second number of LEDs, the second number of LED drivers different from the first number of LED drivers, the computer-executable instructions may cause the lighting controller to detect a number of LED drivers currently coupled to the cabinet. The computer-executable instructions may further cause the lighting controller to, based on the detected total number of LED drivers, determine if (i) the first lighting strip is currently coupled to the cabinet and (ii) the second lighting strip is currently coupled to the cabinet. The computer-executable instructions may further cause the lighting controller to select a display sequence from the memory based at least in part on the determination. The computer-executable instructions may further cause the lighting controller to instruct LED drivers currently coupled to the cabinet to display the selected display sequence.

DETAILED DESCRIPTION

Figure 1:
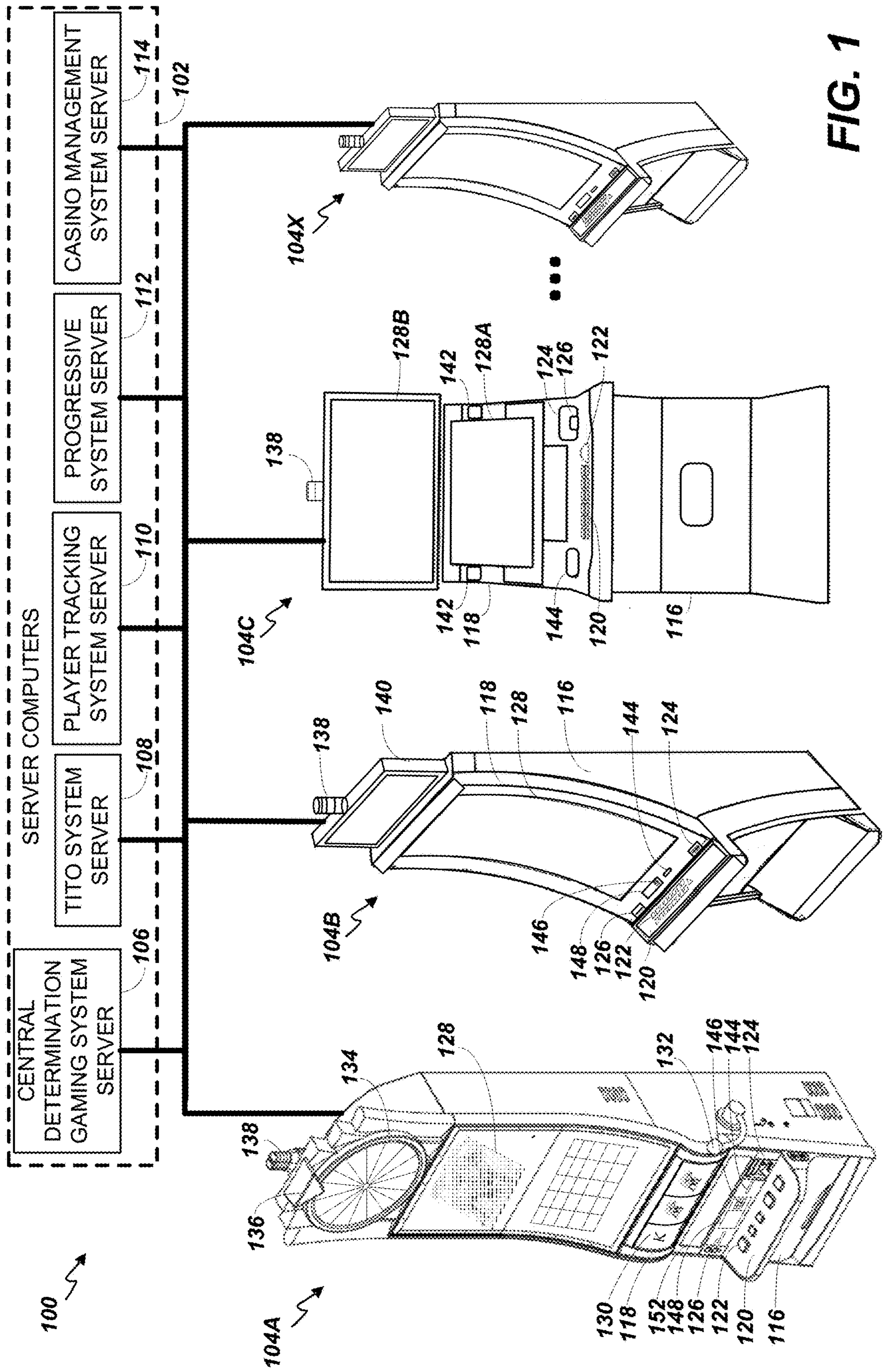
FIG. 1 is an exemplary diagram showing several gaming machines networked with various gaming related servers.

The systems and methods described herein include an electronic gaming device. The electronic gaming device may include a cabinet and one or more lighting strips removably coupled to the cabinet. For example, three lighting strips may be positioned respectfully along a left, right, and top side of the cabinet, with the left-side and right-side lighting strips being removable (e.g., capable of being removed and/or reattached to the without breaking or dismantling the lighting strips or the cabinet). The electronic gaming devices may be positioned in a bank or row, and the lighting strips located adjacent to another electronic gaming device may be removed, so that the remaining lighting strips form a single frame around the bank of electronic gaming machines. It may be desirable that the lighting sequences displayed on the remaining lighting strips be synchronized, so that, for example, a single coherent pattern is displayed across the entire bank of electronic gaming devices. To perform this synchronization, each electronic gaming device in the bank may determine its respective position (e.g., whether it is at a left side, center, or right side of the bank). As described in further detail below, each electronic gaming device may be configured to determine its position based on which of the lighting strips (e.g., left, right, both left and right, or neither left nor right) have been removed.

Each of the one or more lighting strips may include a plurality of LEDs and a plurality of LED drivers configured to control respective LEDs based on instructions received from a lighting controller of the electronic gaming device. The lighting controller may be configured to detect a current number of LED drivers currently coupled to the cabinet. This detected number of LED drivers may be used to determine how many and which lighting strips are present or have been removed from the cabinet. In the exemplary embodiment, the lighting strips may include a first lighting strip (e.g., the left-side lighting strip) having a first number of LED drivers and a second lighting strip (e.g., the right-side lighting strip) having a second number of LED drivers. Accordingly, the lighting controller may determine which of the lighting strips are present based on how many LED drivers (e.g., the first number, the second number, or the sum of the first and second numbers, or none) are currently present on the cabinet.

In some exemplary embodiments, the first and second lighting strips may be of the same length and/or number of LEDs. In such embodiments, one of the lighting strips may include a "dummy" LED driver that does not control a respective LED. In other words, while both lighting strips may have the same number of LEDs, the lighting strips may have a different number of LED drivers. Accordingly, even if two lighting strips (e.g., the left-side and right-side lighting strips) are the same length and/or have the same number of LEDs, the lighting controller may still be able to determine which of the lighting strips are present based on a count of the LED drivers, because the two strips have a different number of LED drivers due to the presence of the dummy LED driver on one of the lighting strips.

Based on the determination of which lighting strips are present, the lighting controller may further determine the position (e.g., left, right, or center) of the cabinet within the bank of electronic gaming devices. For example, if the lighting controller determines that only the left-side lighting strip is present on the cabinet, the lighting controller may determine that the cabinet is at a left end of the bank. Similarly, the lighting controller may determine the cabinet is at the right end of the bank of only the right-side lighting strip is present, at the center of the bank if neither the left-side nor right-side lighting strip is present, or standing alone (e.g., not in a bank) if both the left-side and right-side lighting strips are present.

After determining which lighting strips are present on the cabinet, the lighting controller may be configured to select a display sequence and instruct the LED drivers currently coupled to the cabinet to display the selected display sequence. This selection may be based in part on a position of the cabinet within the bank of electronic gaming devices, which may enable the lighting strips around the bank to display in a synchronized fashion.

Accordingly, the electronic gaming device described herein may provide at least the following technical benefits: (a) an ability for an electronic gaming device having removable lighting strips to determine which of the lighting strip have been removed based on a count of LED drivers of the lighting strips, wherein at least one of the lighting strips includes one or more dummy LED drivers to disambiguate between lighting strips having a same length and/or number of LEDs, and/or (b) an ability for an electronic gaming device to determine its own position (e.g., left, right, center, or free-standing) with respect to a bank of electronic gaming devices based on a determination of which lighting strips (e.g., left-side and/or right-side lighting strips) are present on the electronic gaming device cabinet and to synchronize a display sequence of on the lighting strips throughout the bank of electronic gaming devices based on the determined positions of the electronic gaming devices.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, and/or total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
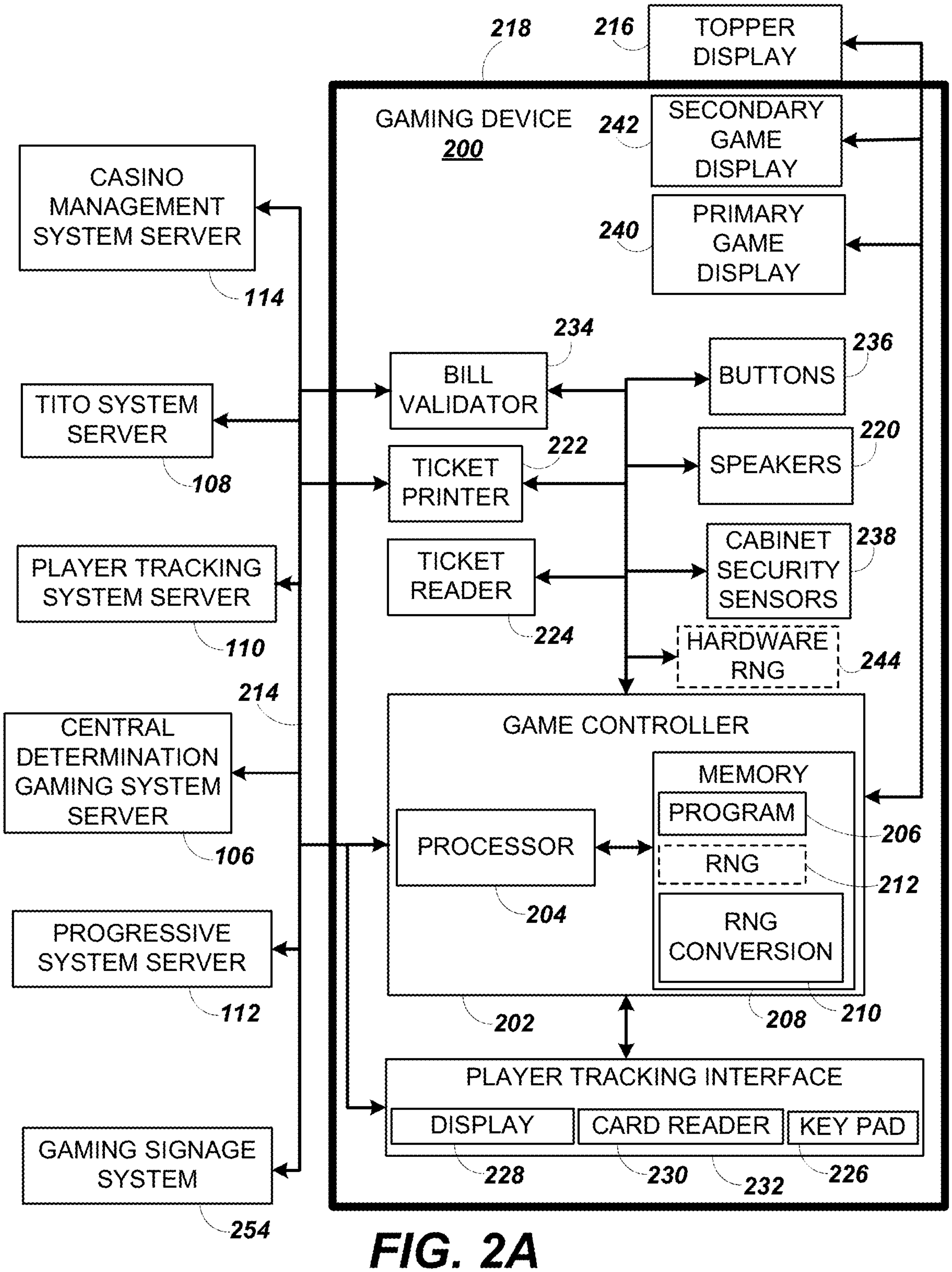
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
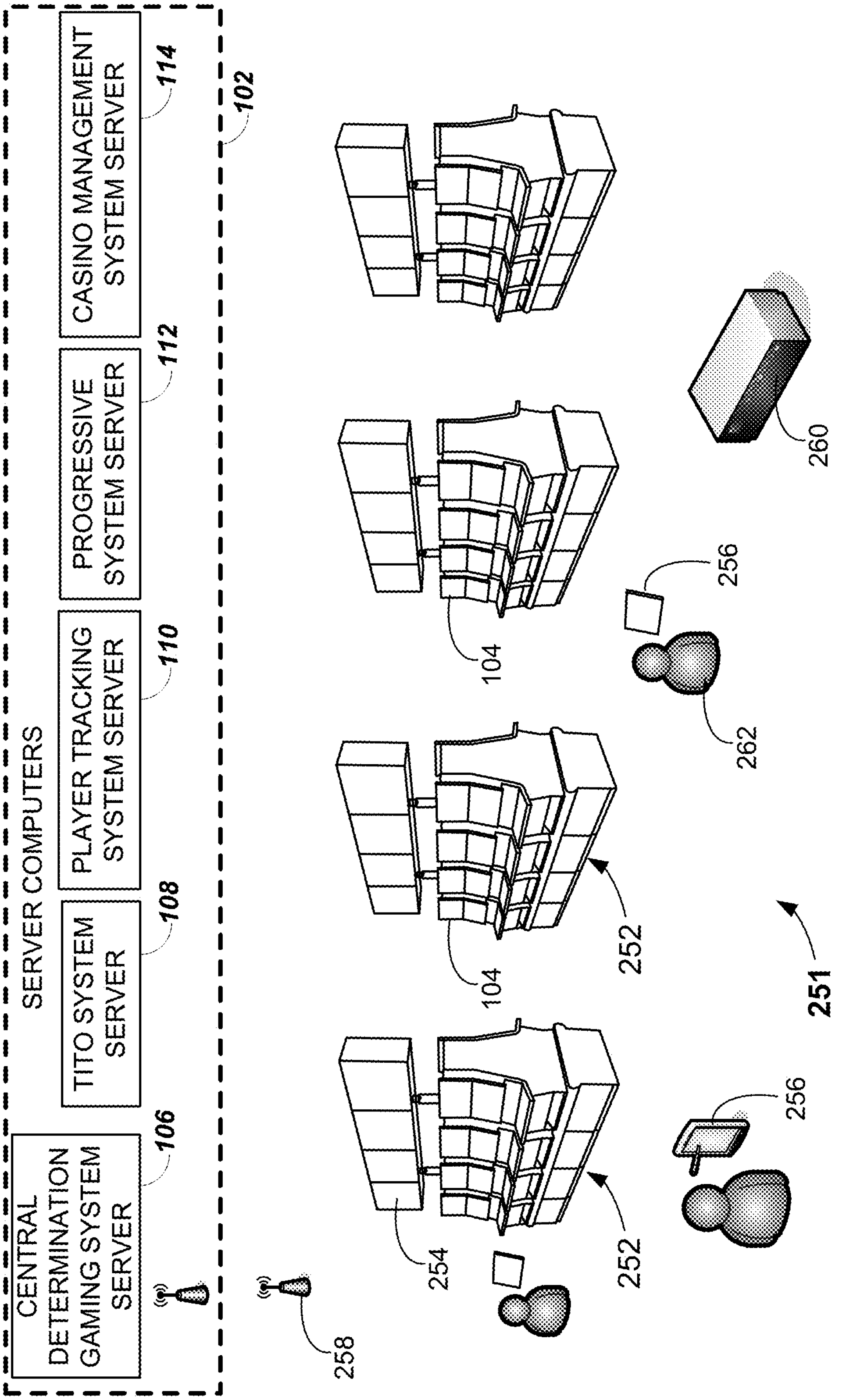
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
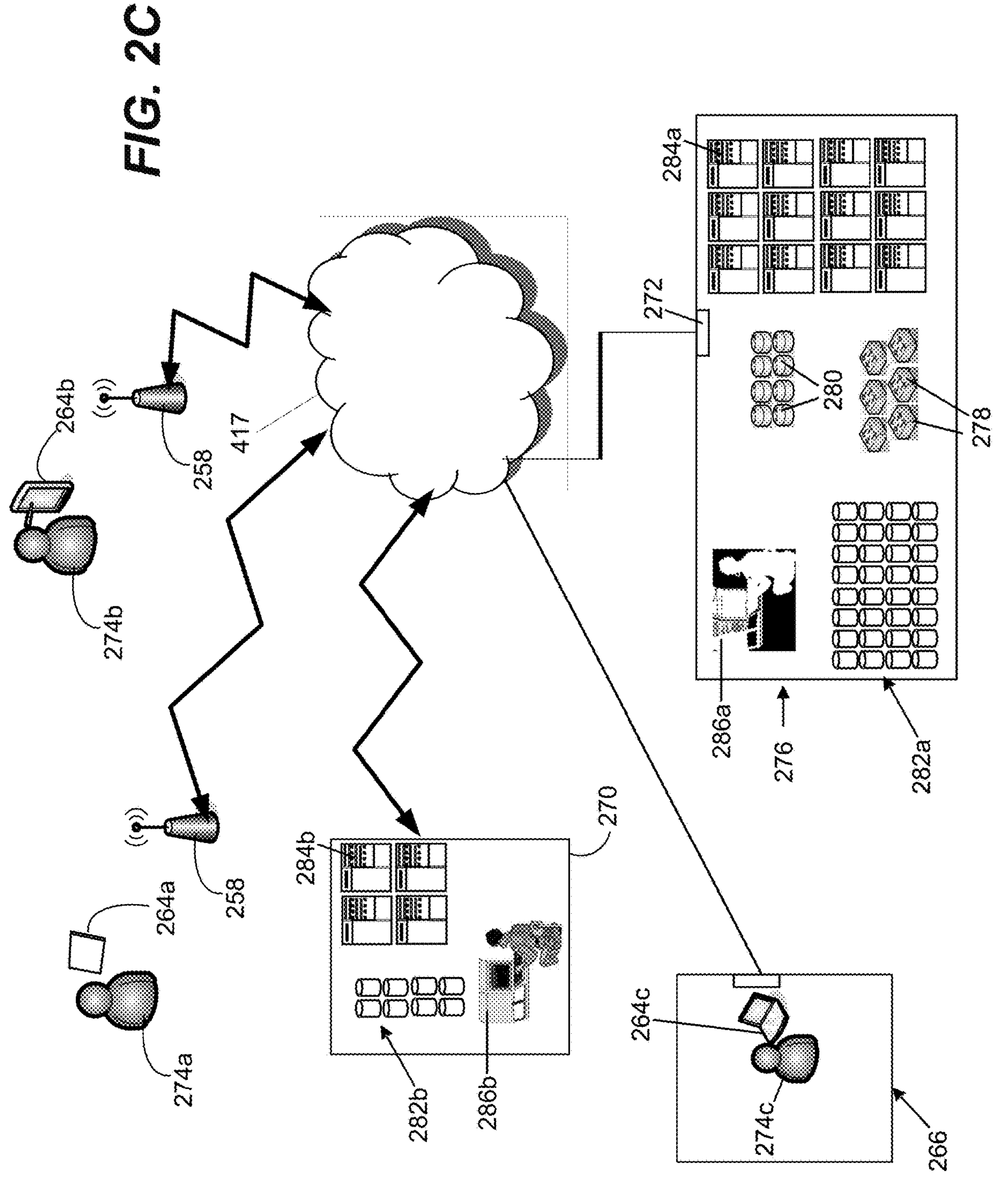
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*. 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
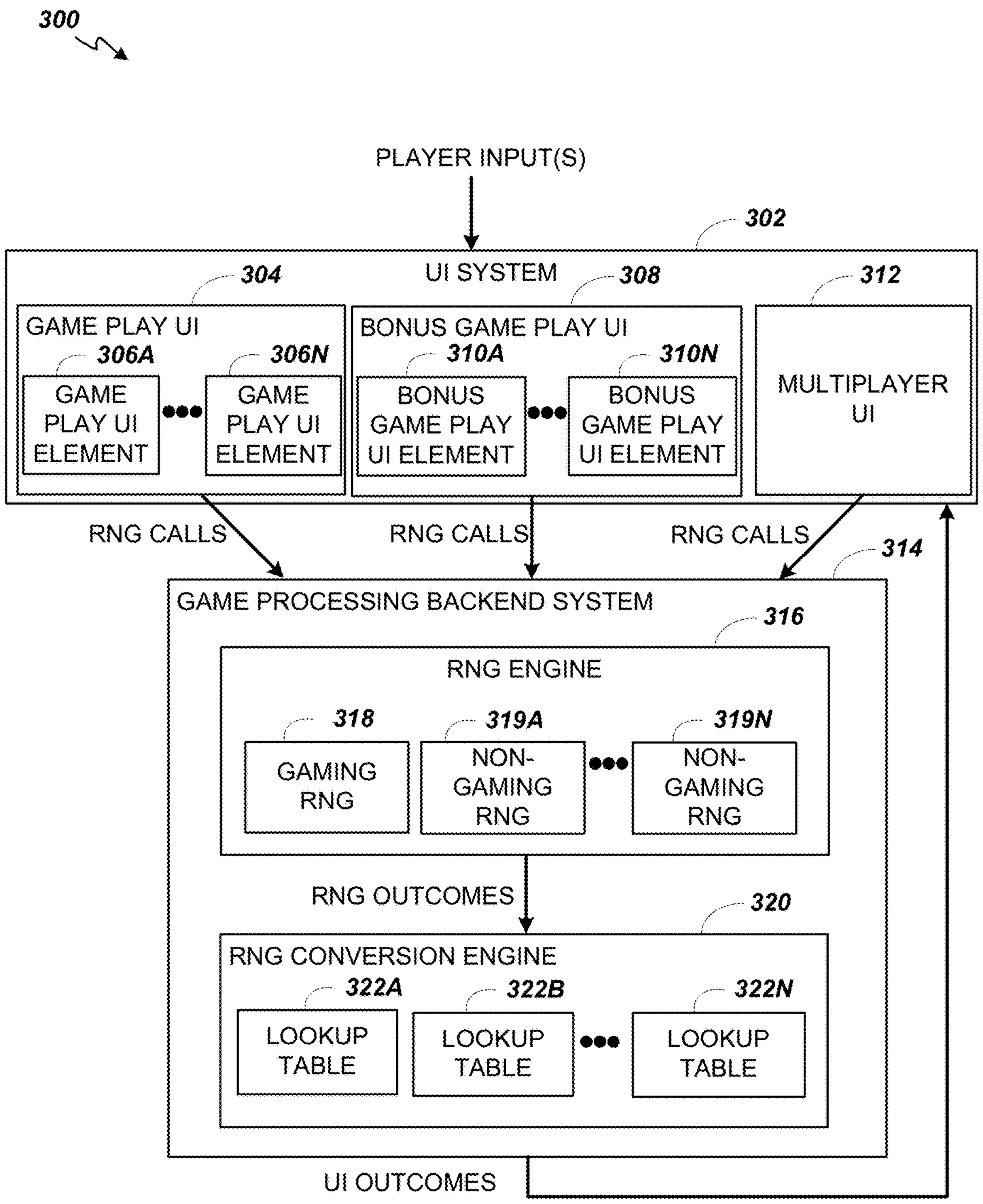
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
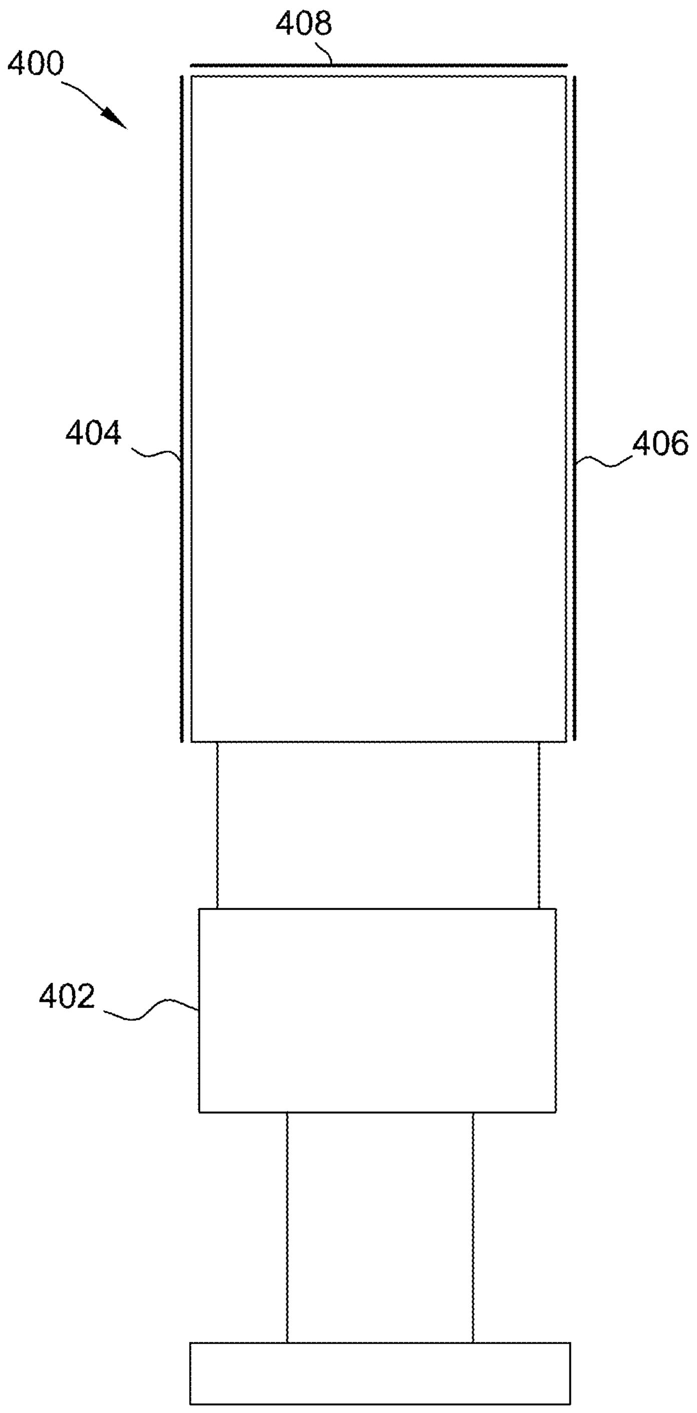
FIG. 4 illustrates an exemplary electronic gaming machine that includes removable lighting strips according to an embodiment of the present disclosure.
Figure 5:
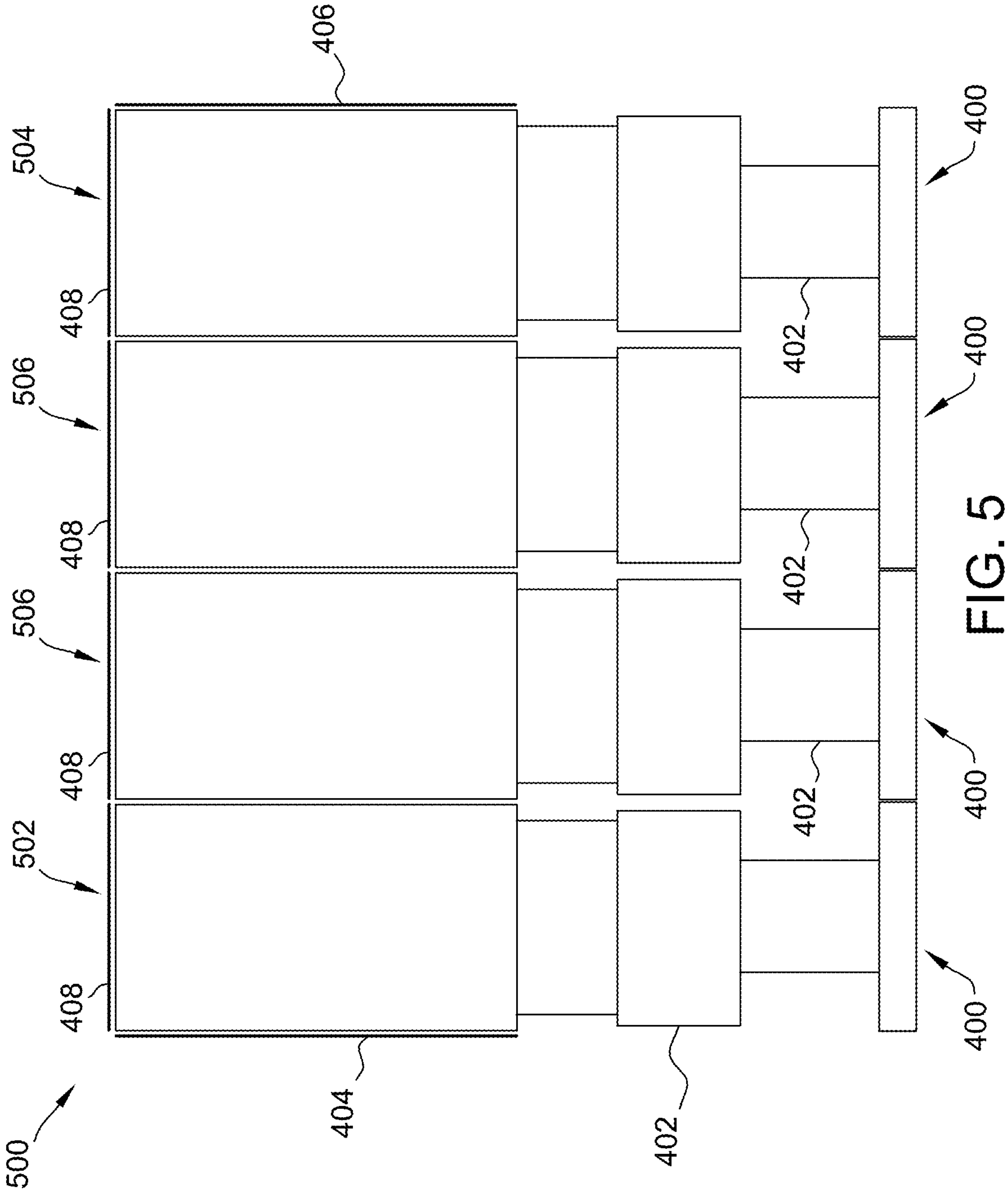
FIG. 5 illustrates an exemplary bank of electronic gaming machines such as the electronic gaming machine shown in FIG. 4.

FIG. 4 illustrates an example EGM 400, which may generally function as described with respect to gaming devices 104A-X depicted in FIG. 1. FIG. 5 illustrates a bank 500 of EGMs 400 positioned adjacently in a row. EGM 400 includes a cabinet 402 and a plurality of lighting strips including a left lighting strip 404 (sometimes referred to herein as a "left-side lighting strip"), a right lighting strip 406 (sometimes referred to herein as a "right-side lighting strip"), and a top lighting strip 408. One or more of the lighting strips may be removably attached to cabinet 402 (e.g., capable of being removed and/or reattached to cabinet 402 without breaking or dismantling the lighting strips and/or cabinet 402, such as by using screws). In an exemplary embodiment, left lighting strip 404 and right lighting strip 406 may be removably attached to cabinet 402, while top lighting strip 408 may be permanently attached to cabinet 402. Alternatively, in some embodiments, any combination of left lighting strip 404, right lighting strip 406, and top lighting strip 408 may be removable.

As shown in FIG. 5, left lighting strips 404 and/or right lighting strips 406 may be removed from cabinets 402 to form a single frame of lighting strips around bank 500. For example, a left-most cabinet 502 may have its right lighting strip 406 removed, a right-most cabinet 504 may have its left lighting strip 404 removed, and center cabinets 506 may have their left lighting strips 404 and right lighting strips 406 removed to form single frame along a left side of left-most cabinet 502, a top of each cabinet 402, and a right side of right-most cabinet 504. As described in further detail below with respect to FIG. 6, EGMs 400 may be capable of determining their location (e.g., whether they are a left-most cabinet 502, right-most cabinet 504, or center cabinet 506 and/or a position number within bank 500) based on which lighting strips are currently attached or removed. This determination of whether cabinet 402 is in a left position, a center position, or a right position may be used to synchronize the displays (e.g., the lighting strips or other portions of the display) of EGMs 400. Because each EGM 400 is capable of determining its respective position based on which lighting strips are connected, EGMs 400 do not need to be preconfigured with information about their respective locations, which may speed up the setup process of EGMs 400.

Figure 6:
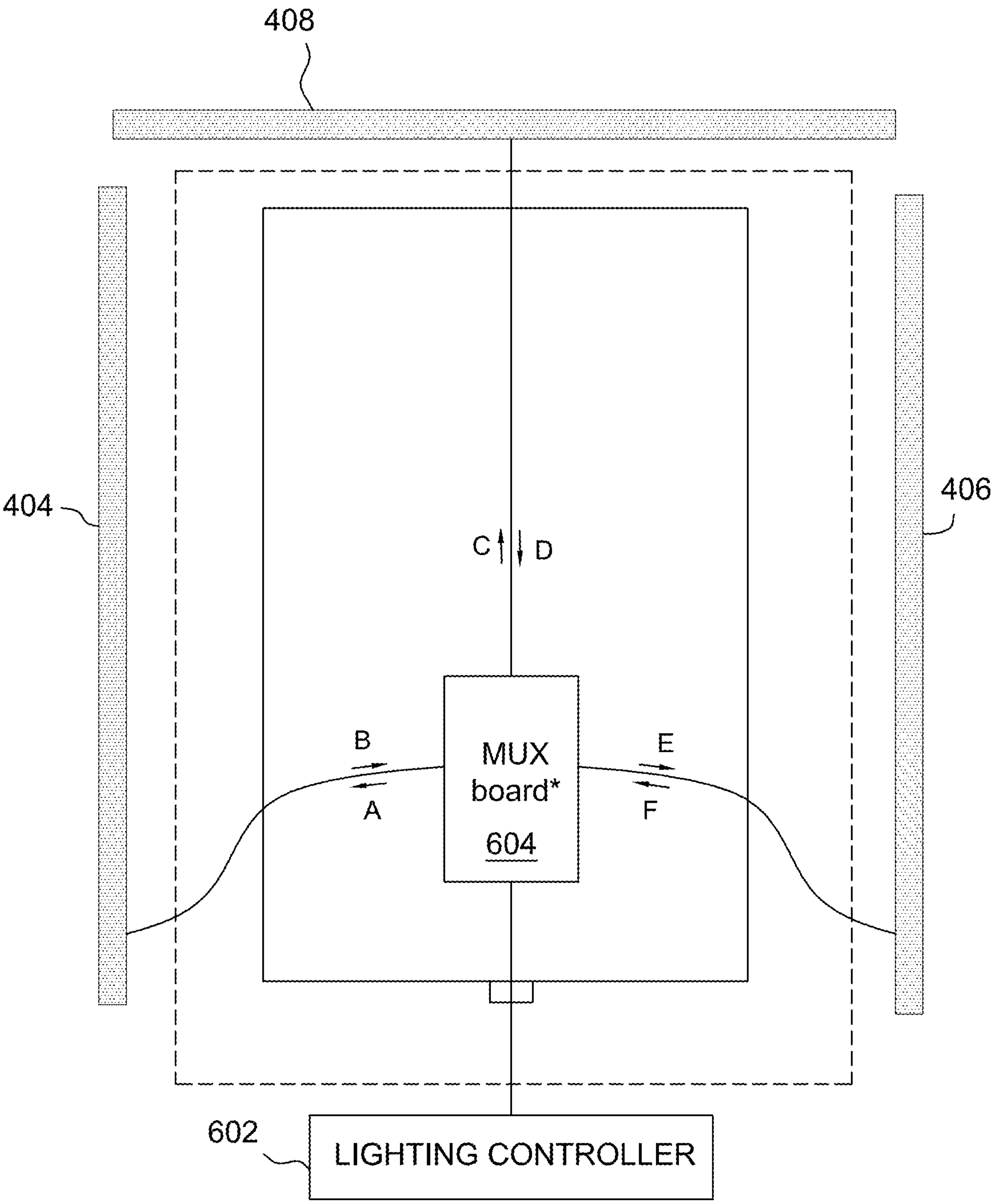
FIG. 6 is a partial schematic diagram of the electronic gaming machine shown in FIG. 4.

FIG. 6 is a schematic diagram illustrating additional components of EGM 400 including light controller 602 and multiplexer (MUX) board 604. Each left lighting strip 404, right lighting strip 406, and top lighting strip 408 may include a plurality of LED drivers (described in more detail below with respect to FIG. 7) each configured to control (e.g., activate or deactivate) one or more LEDs based on data received from light controller 602. This data may be transmitted serially, for example, flowing from a first LED driver of left lighting strip 404, through top lighting strip 408, to a last LED driver of right lighting strip 406, with MUX board 604 routing the data through left lighting strip 404, top lighting strip 408, and right lighting strip 406. This data flow sequence is indicated in order by arrows A, B, C, D, E, and F. The MUX board 604 may be able to: (1) route lighting data around the loop made by the three lighting strips (i.e., left lighting strip 404, top lighting strip 408, and right lighting strip 406); and (2) keep a continuous loop for: (i) a lighting display through three lighting strips (i.e., left lighting strip 404, top lighting strip 408, and right lighting strip 406); or (ii) a lighting display through two lighting strips (e.g., left lighting strip 404 and top lighting strip 408 as two lighting strips OR right lighting strip 406 and top lighting strip 408 as the two lighting strips). The non-transitory signals in the three lighting strip arrangement may move via a star mechanism between the MUX board 604 and three lighting strips (i.e., left lighting strip 404, top lighting strip 408, and right lighting strip 406), as indicated by arrows A, B, C, D. E, and F. The non-transitory signals in the two lighting strip arrangement may move via a semi-star mechanism between the MUX board 604 and two lighting strips, for example as indicated by a combination of arrows A, B, C, and D if right lighting strip 406 is removed or by arrows C, D, E, and F if left lighting strip 404 is removed. Accordingly, light controller 602 may be capable of determining a total number of LED drivers currently connected to cabinet 402 based on a time it takes for data to cycle through the currently connected lighting strips.

In the exemplary embodiment, light controller 602 may be configured to determine, based on the detected total number of LED drivers, whether left lighting strip 404 is currently coupled to cabinet 402 and whether right lighting strip 406 is currently coupled to the cabinet 402. Lighting controller 602 may compare the detected number of LED drivers to predefined values stored in the memory corresponding to a number of LED drivers that would be present for each lighting configuration. For example, if the number of detected LED drivers equals the number of LED drivers of top lighting strip 408, light controller 602 may be configured to determine that both left lighting strip 404 and right lighting strip 406 have been removed from cabinet 402. In embodiments in which multiple lighting strips are the same length and have the same number of LEDs, such as left lighting strip 404 and right lighting strip 406 as shown in FIGS. 4-6, one of the lighting strips (e.g., right lighting strip 406) may include a "dummy" LED driver that does not actually control any LEDs. By including the dummy LED driver, right lighting strip 406 may have a different number of LED drivers than left lighting strip 404 while still maintaining the same number of LEDs. Because left lighting strip 404 and right lighting strip 406 include different number of LED drivers, light controller 602 may determine which, if either, of left lighting strip 404 and right lighting strip 406 have been removed.

For example, left lighting strip 404 and right lighting strip 406 may each include 20 LEDs, and top lighting strip 408 may include 10 LEDs. Each of the LEDs may have a corresponding LED driver, and right lighting strip 406 may include an extra dummy LED driver, so that left lighting strip 404 may include 20 LED drivers, right lighting strip 406 may include 21 LED drivers, and top lighting strip may include 10 LED drivers, for a total of 51 LED drivers. Accordingly, if light controller 602 detects 51 LED drivers, light controller 602 may determine that neither left lighting strip 404 nor right lighting strip 406 have been removed from cabinet 402. If light controller 602 detects 31 LED drivers, light controller 602 may determine that only left lighting strip 404 has been removed from cabinet 402 (e.g., because 51 total LED drivers minus the 20 LED drivers of left lighting strip 404 equals 31). If light controller 602 detects 30 LED drivers, light controller 602 may determine that only right lighting strip 406 has been removed from cabinet 402 (e.g., because 51 total LED drivers minus the 21 LED drivers of right lighting strip 406 equals 30). If light controller 602 detects 10 LED drivers, light controller 602 may determine that both left lighting strip 404 and right lighting strip 406 have been removed (e.g., because 51 total LED drivers minus the 20 LED drivers of left lighting strip 404 minus the 21 LED drivers of right lighting strip 406 equals 10.

While FIGS. 4-6 illustrate EGM 400 as having three lighting strip, of which two (left lighting strip 404 and right lighting strip 406) have the same length, in alternative embodiments, EGM 400 may include any number of lighting strips, any of which may or may not be of the same length as any of the other lighting strips. Generally, the dummy LED driver may be used in cases in which removal of different combinations of LED strips results in a same total number of LED drivers present. In such cases, one or more dummy LED drivers may be added to any of the lighting strips (e.g., those having the same length) in order to eliminate this ambiguity.

In the exemplary embodiment, light controller 602 may be further configured to select a display sequence from a memory (e.g., memory 208 shown in FIG. 2) based on the determination of which lighting strips have been removed. Each display sequence may include instructions that cause the LEDs to activate at specific times, for example, in order to display different patterns of light, color, and/or images. The display sequences and rules under which certain display sequences are displayed may be stored in the memory by an operator (e.g., via network 214). Light controller 602 may select a display sequence having a length that matches the number of LEDs currently attached to cabinet 402. For example, if 30 LEDs are present, light controller 602 may select a display sequence including instructions for 30 LEDs. Because the dummy LED drivers do not control an LED, in selecting a display sequence, light controller 602 may consider the number of actual LEDs or LED modules present on cabinet 402, rather than the number of LED drivers. For example, if 31 LED drivers are present, but one of the LED drivers is a dummy LED driver, light controller 602 may select a display sequence including instructions for 30 LEDs. As described above, light controller 602 may further select a display sequence depending on which lighting strips (e.g., left lighting strip 404, right lighting strip 406, and/or top lighting strip 408 are currently mounted to the board). For example, one or more separate display sequences may be associated with each of (1) both left lighting strip 404 and right lighting strip 406 being present, (2) only left lighting strip 404 being present. (3) only right lighting strip 406 being present, and/or (4) neither left lighting strip 404 nor right lighting strip 406 being present.

Accordingly, to select the display sequence, light controller 602 may perform a lookup in the memory based on, the lighting strips that are present on cabinet 402, a number of LEDs present on cabinet 402, a location and/or position of EGM 400 (e.g., within bank 500 and/or within a casino floor), a game configuration of EGM 400, a current time, and/or other such factors.

In the exemplary embodiment, light controller 602 may be further configured to instruct LED drivers currently coupled to the cabinet to display the selected display sequence. As described above, the instructions of the selected display sequence may be provided to the LED drivers serially and/or sequentially, with light controller 602 providing instructions to MUX board 604 to route the instructions to each lighting strip present on cabinet 402.

In some embodiments, lighting controller 602 may be configured to determine, based on the determination of whether left lighting strip 404 and/or right lighting strip 406 is currently connected to cabinet 402, whether cabinet 402 is in certain position (e.g., a left, center, or right position) within a row of EGMs 400 such as bank 500. For example, if both left lighting strip 404 and right lighting strip 406 have been removed, lighting controller 602 may determine that cabinet 402 is in a center position. Lighting controller 602 may be further configured to store an indicator of whether the cabinet is in a left, center, or right position in the memory. In some such embodiments, this indicator may be used to determine which display sequence to display. For example, the display sequency may be coordinated or synchronized with the display of other EGMs 400 in bank 500 based each EGM 400 determining its respective position.

In some embodiments light controller 602 may be a software and/or hardware module integrated with other software and/or hardware modules of EGM 400, such as a gadget board and/or game controller 202. Alternatively, light controller 602 may be a stand-alone software and/or hardware module. In embodiments in which light controller 602 is implemented as a stand-alone module, certain functions described herein with respect to light controller 602 may be performed by other components. For example, in some embodiments, light controller may determine a number of LEDs and which lighting strips are present on cabinet 402 and provide this information to another module such as game controller 202, which may select a display sequence and provide the selected display sequence to light controller 602.

Figure 7:
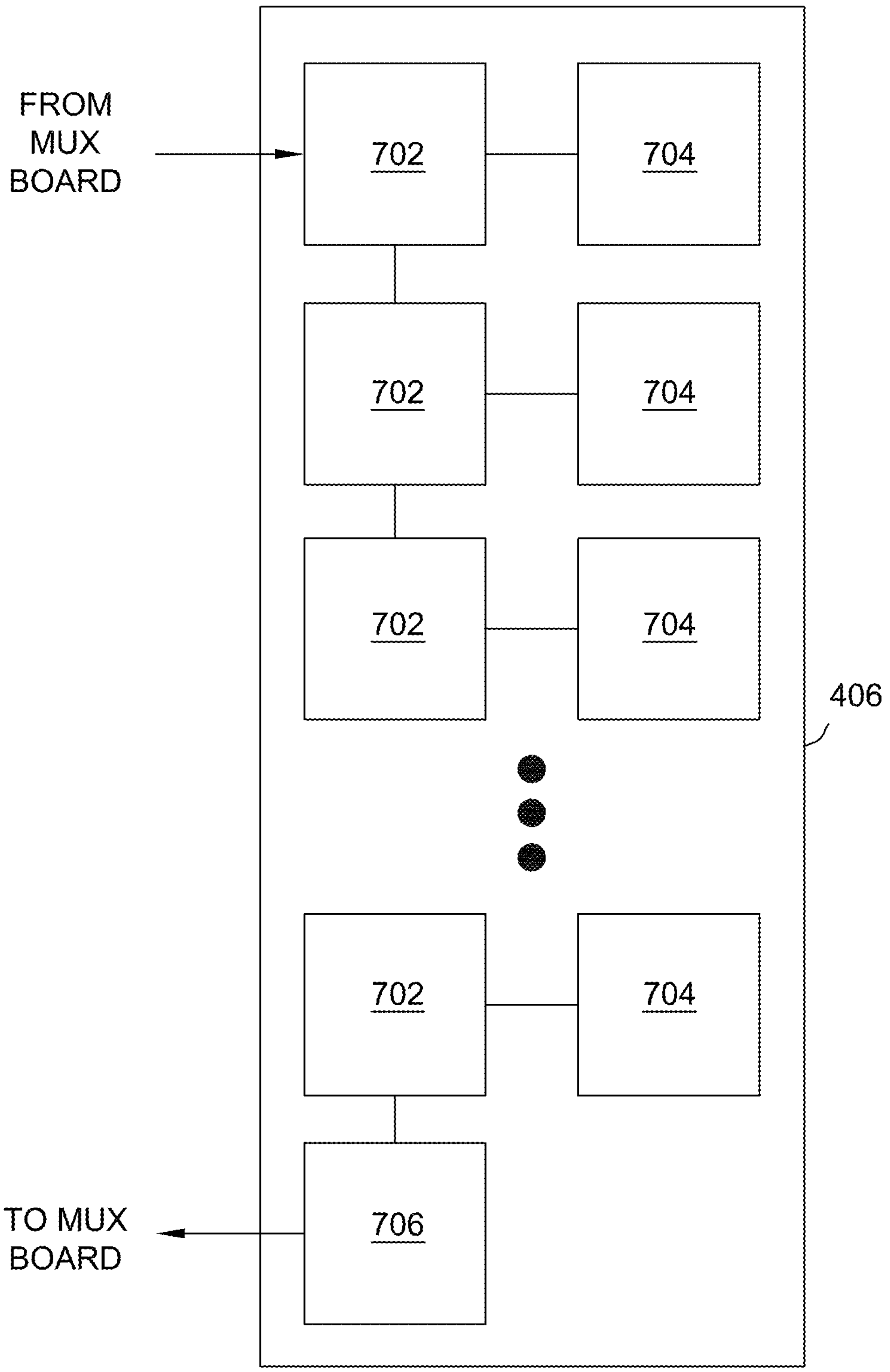
FIG. 7 is a schematic diagram of a lighting strip for use in the electronic gaming machine shown in FIG. 4.

FIG. 7 is a schematic diagram depicting right lighting strip 406 according to the exemplary embodiment. As described above, right lighting strip 406 may include a plurality of LED drivers 702 each configured to control at least one LED 704 based on instructions received from lighting controller 602 through MUX board 604. More particularly, in some embodiments, the plurality of LED drivers 702 may be connected to each other and each LED driver of the plurality of LED drivers 702 may be operatively connected to a respective LED. Right lighting strip 406 may further include a dummy LED driver 706, which may be the same or similar in structure as LED drivers 702. Unlike LED drivers 702, dummy LED driver 706 does not control a respective LED 704. Dummy LED driver 706 may be detected by lighting controller 602 as lighting controller 602 determines the total number of LED drivers present on cabinet 402. Because left lighting strip 404 may include the same number of LEDs 704 but lack dummy LED driver 706, lighting controller 602 may distinguish between a removal of right lighting strip 406 and left lighting strip 404 based on the presence or lack thereof of dummy LED driver 706 in the total number of LED drivers counted. The combination of the dummy LED driver 706 and LED drivers 702 and respective LED 704 in right lightning strip 406 may control the activation/deactivation of two sides of the upper display lighting where top light strip 408 always stays on, depending on where machines are in a bank next to each other, thereby obviating a vertical lighting strip showing when the machines are side by side (a three-sided picture frame effect for all the machines in a bank).

Figure 8:
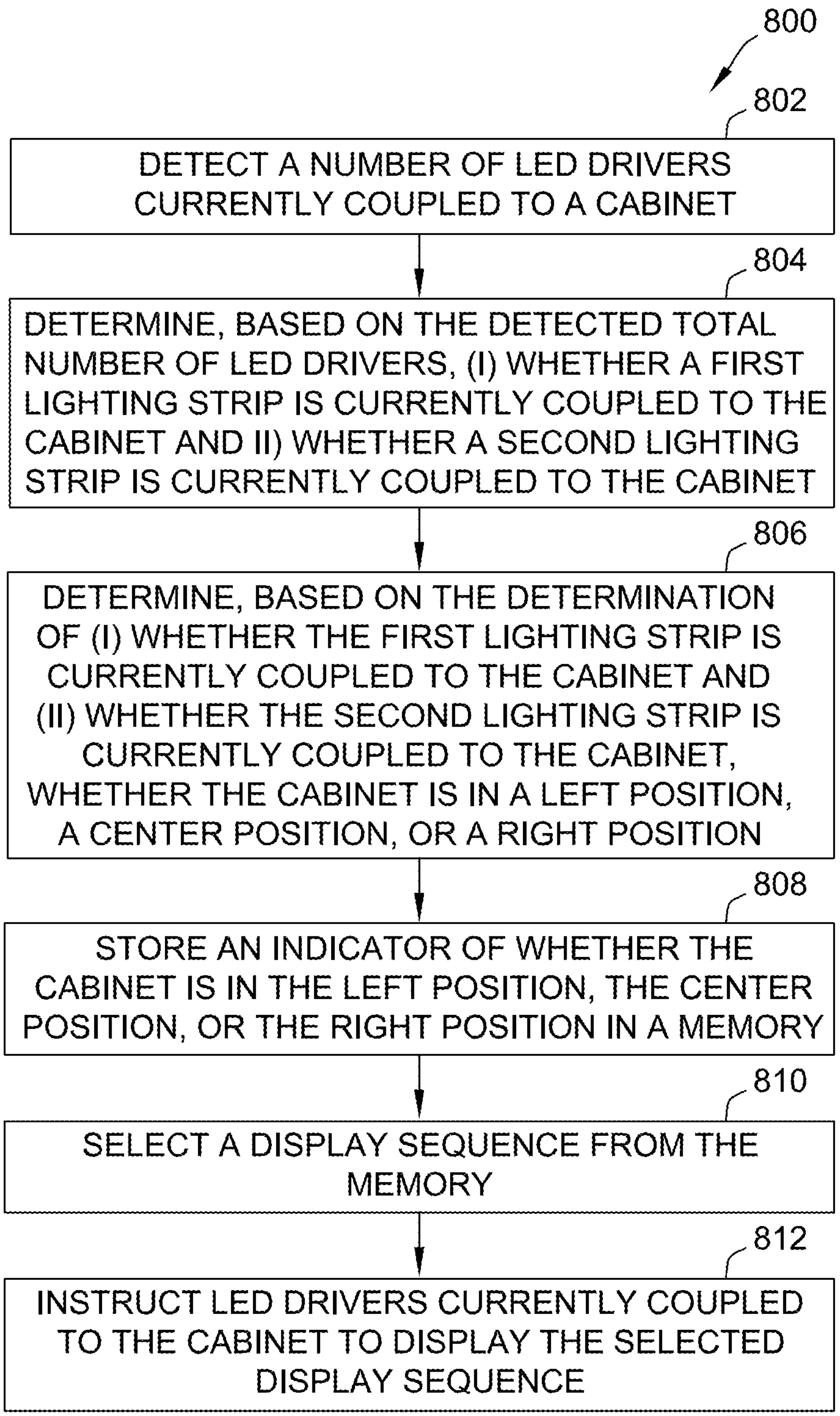
FIG. 8 is a flowchart depicting an exemplary method controlling lighting for an electronic gaming device according to an embodiment of the present disclosure.

FIG. 8 is a flowchart depicting an example method 800 for controlling lighting for EGM 400. In the exemplary embodiment, method 800 may be performed by lighting controller 602 of EGM 400. Method 800 may include detecting 802 a number of LED drivers (e.g., including both LED drivers 702 and any dummy LED drivers 706) currently coupled to the cabinet. Method 800 may further include determining 804, based on the detected total number of LED drivers, (i) whether the left lighting strip 404 is currently coupled to cabinet 402 and (ii) whether right lighting strip 406 is currently coupled to cabinet 402. In some embodiments, detected number of LED drivers may be compared to predefined values stored in the memory to determine whether left lighting strip 404 and/or right lighting strip 406 lighting strips are coupled to cabinet 402.

In the exemplary embodiment, method 800 may further include determining 806, based on the determination of (i) whether the left lighting strip 404 is currently coupled to cabinet 402 and (ii) whether right lighting strip 406 is currently coupled to cabinet 402, whether cabinet 402 is in a left position, a center position, or a right position (e.g., with respect to bank 500). Method 800 may further include storing 808 an indicator of whether cabinet 402 is in the left position, the center position, or the right position in the memory.

In the exemplary embodiment, method 800 may further include selecting 810 a display sequence from the memory based at least in part on the determination of i) whether the left lighting strip 404 is currently coupled to cabinet 402 and ii) whether right lighting strip 406 is currently coupled to cabinet 402. In some embodiments, the selection may be based further on the indicator stored in the memory of whether cabinet 402 is in the left position, the center position, or the right position. Method 800 may further include instructing 812 LED drivers 702 currently coupled to cabinet 402 to display the selected display sequence.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device including:

a cabinet;

a memory;

a first lighting strip removably coupled to the cabinet, wherein the first lighting strip comprises a first number of light emitting diode (LED) drivers and a first number of LEDs;

a second lighting strip removably coupled to the cabinet, wherein the second lighting strip comprises a second number of LED drivers and a second number of LEDs; and a lighting controller configured to:

detect a number of LED drivers currently coupled to the cabinet;

based on the detected number of LED drivers, determine if: (i) the first lighting strip is currently coupled to the cabinet and (ii) the second lighting strip is currently coupled to the cabinet;

select a display sequence from the memory based at least in part on the determination; and instruct LED drivers currently coupled to the cabinet to display the selected display sequence, wherein the second number of LED drivers is different from the first number of LED drivers.

2. The electronic gaming device of claim 1, wherein the first number of LEDs in the first lighting strip is equal to the second number of LEDs in the second lighting strip.

3. The electronic gaming device of claim 1, wherein the first number of LED drivers of first lighting strip is equal to the first number of LEDs, and wherein the second number of LED drivers of the second lighting strip is greater than the first number of LEDs.

4. The electronic gaming device of claim 3, wherein the second lighting strip further comprises a dummy LED driver, wherein the dummy LED driver does not control a respective LED.

5. The electronic gaming device of claim 1, wherein the lighting controller is further configured to compare the detected number of LED drivers to predefined values stored in the memory to determine if: (i) the first lighting strip is currently coupled to the cabinet and (ii) the second lighting strip is currently coupled to the cabinet.

6. The electronic gaming device of claim 1, wherein the first lighting strip is a left-side lighting strip and the second lighting strip is a right-side lighting strip.

7. The electronic gaming device of claim 6, wherein the lighting controller is further configured to:

in response to determining: (i) whether the first lighting strip is currently coupled to the cabinet and (ii) whether the second lighting strip is currently coupled to the cabinet, determine if the cabinet is in a left position, a center position, or a right position; and store an indicator of whether the cabinet is in the left position, the center position, or the right position in the memory.

8. The electronic gaming device of claim 7, wherein the lighting controller is further configured to select the display sequence based at least in part on the indicator of whether the cabinet is in the left position, the center position, or the right position.

9. The electronic gaming device of claim 1, further comprising a multiplexer (MUX) board, wherein the lighting controller is further configured to instruct the MUX board to route the selected display sequence to the LED drivers currently coupled to the cabinet.

10. A method for controlling lighting for an electronic gaming device including a cabinet a memory a first lighting strip removably coupled to the cabinet, the first lighting strip including a first number of light emitting diode (LED) drivers and a first number of LEDs, and a second lighting strip removably coupled to the cabinet, the second lighting strip including a second number of LED drivers and a second number of LEDs, the second number of LED drivers different from the first number of LED drivers, the method comprising:

detecting a number of LED drivers currently coupled to the cabinet;

based on the detected total number of LED drivers, determining if: (i) the first lighting strip is currently coupled to the cabinet and (ii) the second lighting strip is currently coupled to the cabinet;

selecting a display sequence from the memory based at least in part on the determination; and instructing LED drivers currently coupled to the cabinet to display the selected display sequence.

11. The method of claim 10, wherein the first number of LEDs in the first lighting strip is equal to the second number of LEDs in the second lighting strip.

12. The method of claim 10, wherein the first number of LED drivers of first lighting strip is equal to the first number of LEDs, and wherein the second number of LED drivers of the second lighting strip is greater than the first number of LEDs.

13. The method of claim 12, wherein the second lighting strip includes a dummy LED driver, wherein the dummy LED driver does not control a respective LED.

14. The method of claim 10, further comprising comparing the detected number of LED drivers to predefined values stored in the memory to determine if: (i) the first lighting strip is currently coupled to the cabinet and (ii) the second lighting strip is currently coupled to the cabinet.

15. The method of claim 10, wherein the first lighting strip is a left-side lighting strip and the second lighting strip is a right-side lighting strip.

16. The method of claim 15, further comprising:

in response to determining: (i) the first lighting strip is currently coupled to the cabinet and (ii) the second lighting strip is currently coupled to the cabinet, determining if the cabinet is in a left position, a center position, or a right position; and storing an indicator of whether the cabinet is in the left position, the center position, or the right position in the memory.

17. The method of claim 16, further comprising selecting the display sequence based at least in part on the indicator of whether the cabinet is in the left position, the center position, or the right position.

18. At least one non-transitory computer-readable storage media having computer-executable instructions embodied thereon, wherein when executed by a lighting controller of an electronic gaming device including a cabinet a memory a first lighting strip removably coupled to the cabinet, the first lighting strip including a first number of light emitting diode (LED) drivers and a first number of LEDs, and a second lighting strip removably coupled to the cabinet, the second lighting strip including a second number of LED drivers and a second number of LEDs, the second number of LED drivers different from the first number of LED drivers, the computer-executable instructions cause the lighting controller to:

detect a number of LED drivers currently coupled to the cabinet;

based on the detected total number of LED drivers, determine if (i) the first lighting strip is currently coupled to the cabinet and (ii) the second lighting strip is currently coupled to the cabinet;

select a display sequence from the memory based at least in part on the determination; and instruct LED drivers currently coupled to the cabinet to display the selected display sequence.

19. The at least one non-transitory computer-readable storage media of claim 18, wherein the first lighting strip is a left-side lighting strip and the second lighting strip is a right-side lighting strip, and wherein the computer-executable instructions further cause the lighting controller to:

in response to determining: (i) the first lighting strip is currently coupled to the cabinet and (ii) the second lighting strip is currently coupled to the cabinet, determine if the cabinet is in a left position, a center position, or a right position; and store an indicator of whether the cabinet is in the left position, the center position, or the right position in the memory.

20. The at least one non-transitory computer-readable storage media of claim 19, wherein the computer-executable instructions further cause the lighting controller to select the display sequence based at least in part on the indicator of whether the cabinet is in the left position, the center position, or the right position.

* * * * *